Nov. 8, 1960   J. H. KONEFES   2,959,305
TRACTOR LOADERS
Filed Jan. 10, 1958   4 Sheets-Sheet 3
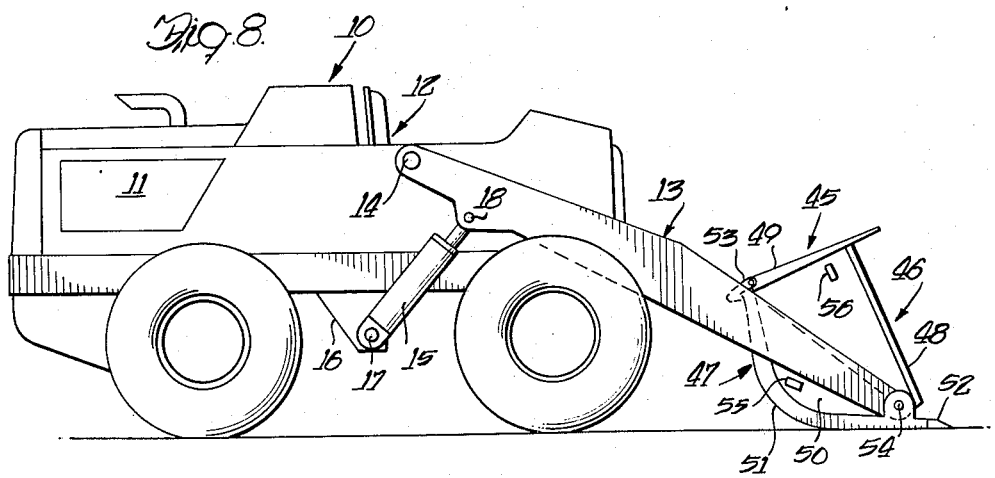
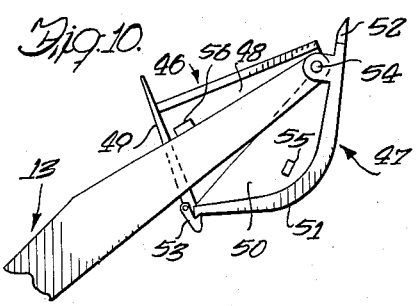
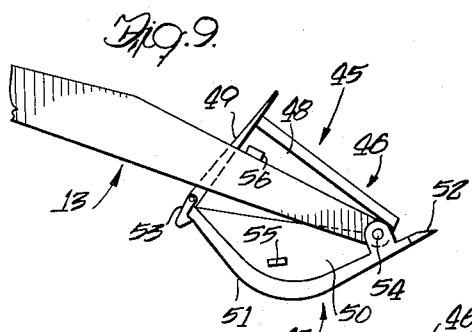
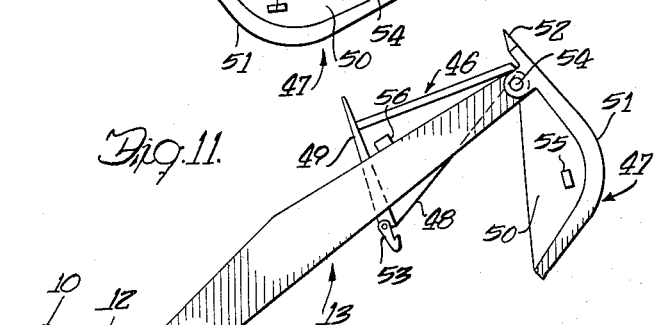
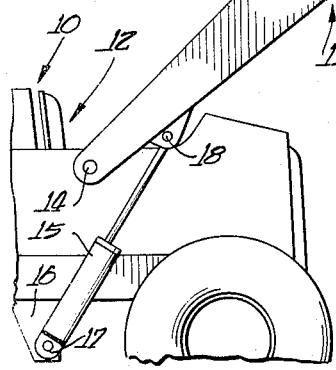
INVENTOR
JOSEPH H. KONEFES
Paul O. Pippel
Atty

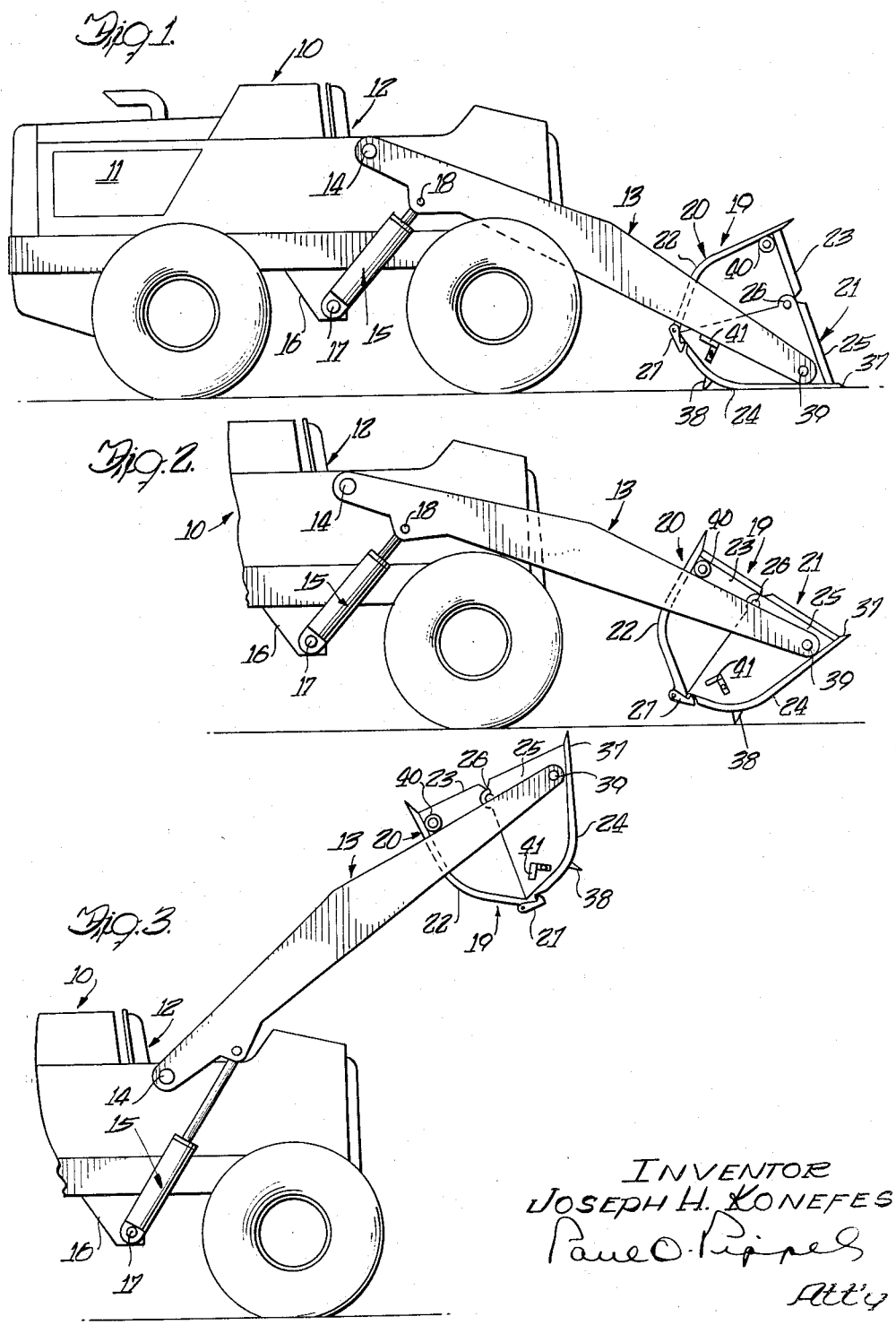

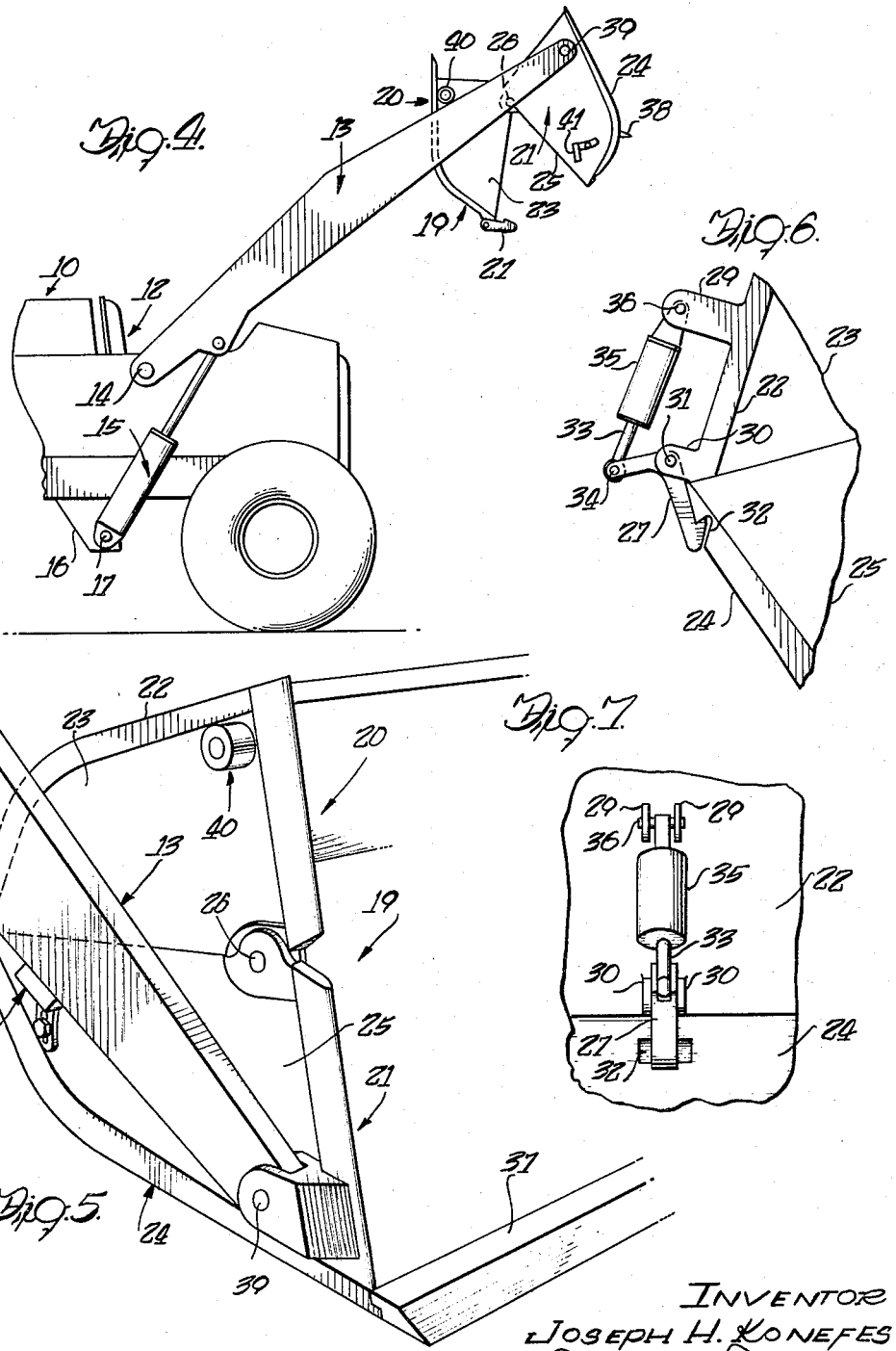

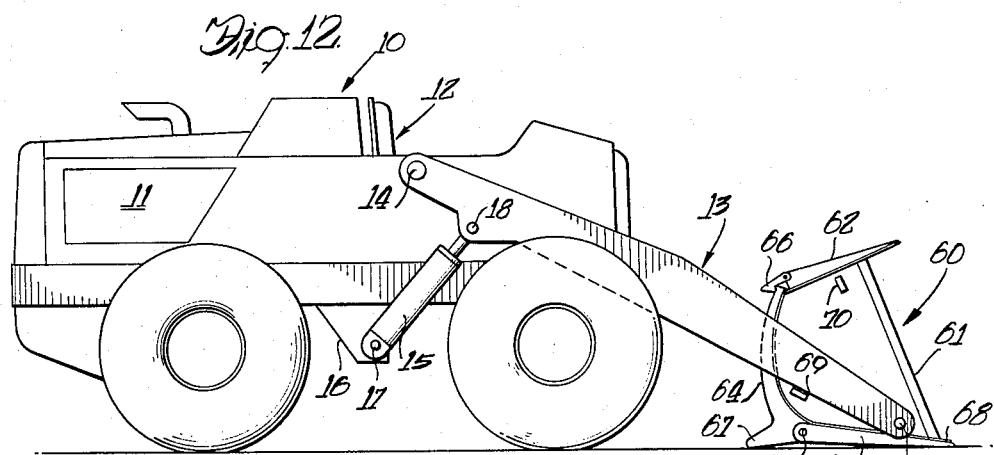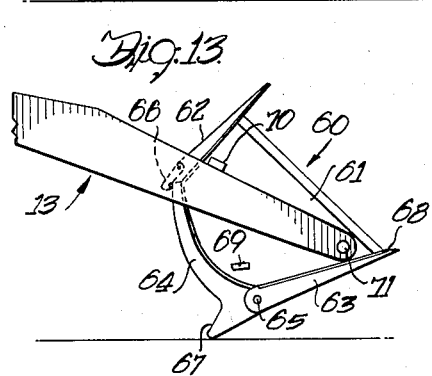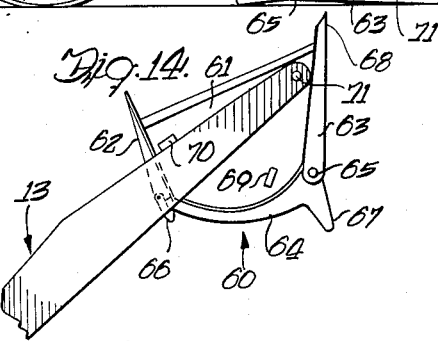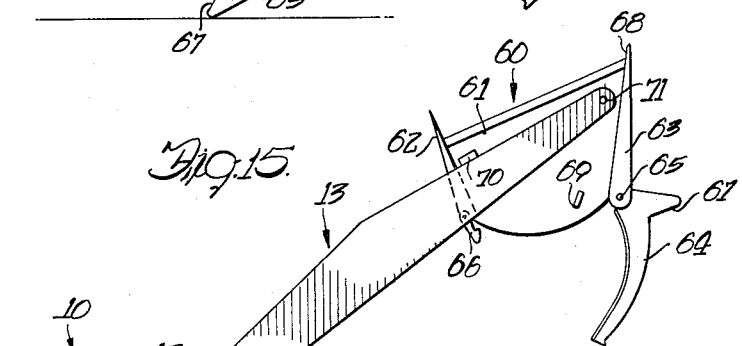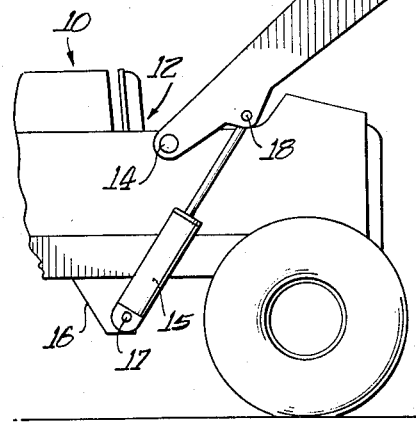

United States Patent Office 2,959,305
Patented Nov. 8, 1960

2,959,305

TRACTOR LOADERS

Joseph H. Konefes, Libertyville, Ill., assignor to The Frank G. Hough Co., a corporation of Illinois Filed Jan. 10, 1958, Ser. No. 708,195

3 Claims. (Cl. 214—140)

This invention relates generally to tractor loaders of the front end type, and more specifically to an improved bucket construction and arrangement for a front end type tractor loader.

Front end type tractor loaders, as generally known in the art, comprise a tractor having boom means operatively carried from the tractor and extending forwardly thereof. The forward end of the boom means is provided with bucket means, and further, generally some means is provided connected between the bucket and the tractor or the boom means for pivoting the bucket to its various necessary operating positions such as those for digging, carrying and dumping. Generally these linkage means as used in the art for controlling the pivoting of the bucket are rather complicated and expensive. The complication has been brought about by reason of the various loader functions which have become an operating requirement of tractor loaders. These requirements are that in digging the bucket should be positioned so that as the tractor is moved forwardly, the cutting edge of the bucket will cut into any material being worked along a substantially horizontal line. Further, when the bucket is loaded and the boom raised a convenient amount for carrying of the load to some remote position, the bucket must then be pivoted rearwardly an amount sufficient to retain substantially a maximum amount of the load within the bucket as the tractor is moved. Additionally, when the boom is raised to the high-lift dump position, the bucket must be pivoted by the linkage means sufficiently to cause efficient dumping of the load from the bucket.

It is the function of the present invention to provide a tractor loader of the front end type with a bucket construction and arrangement such that the various necessary operations of the bucket are performed with a minimum of elements for pivoting of the bucket.

It is another object of the present invention to provide a front end type tractor loader which will automatically adjust itself for proper cutting of any material to be worked and will automatically pivot to retain a maximum amount of any load worked into the bucket as the tractor travels.

It is a further object of the present invention to provide a compound bucket for a front end type tractor loader wherein gravity is used in a number of operations of the bucket for properly positioning the bucket for these operations.

Other objects and features of the present invention will be apparent upon a perusal of the following specification and drawings of which:

Figure 1 is a side elevational view of a tractor loader constructed according to one embodiment of the present invention;

Figure 2 is a partial side elevational view of the structure shown in Figure 1 with the boom raised for the bulldozing function;

Figure 3 is a partial side elevational view of the structure shown in Figure 1 with the boom raised to the high-lift dump position;

Figure 4 is a side elevational view of the structure shown in Figure 3 with the bucket dumped;

Figure 5 is a partial enlarged isometric view of the bucket shown in Figures 1 through 4;

Figure 6 is a partial cross-sectional view of the bucket shown in Figures 1 through 5 showing the latching means for the bucket;

Figure 7 is a partial rear elevational view of the bucket further showing the latching means of Figure 6;

Figure 8 is a side elevational view of a tractor loader constructed according to another embodiment of the present invention;

Figure 9 is a partial side elevational view of the structure shown in Figure 8 with the boom slightly raised above ground level;

Figure 10 is a side elevational view of the structure shown in Figure 8 with the bucket raised to the high-lift dump position;

Figure 11 is a partial side elevational view of the structure shown in Figure 10 with the bucket operated to the dump position;

Figure 12 is a side elevational view of another embodiment of the present invention;

Figure 13 is a partial side elevational view of the structure shown in Figure 12 with the boom slightly raised;

Figure 14 is a partial side elevational view of the structure shown in Figure 12 with the boom raised to the high-lift dump position; and Figure 15 is a side elevational view of the structure shown in Figure 14 with the bucket operated to the dump position.

The present embodiments are the preferred embodiments but it is to be understood, that changes can be made in the present embodiments by one skilled in the art without departing from the spirit and scope of the present invention.

Generally, the present invention comprises three different compound bucket constructions wherein the bucket is pivotally mounted on the forward end of the boom. Various stops are provided on the sides of the buckets so that as the boom is raised and lowered or as the bucket encounters the ground, various certain pivoting actions of the bucket relative to ground level and the boom will take place so that digging, carrying and dumping of any material to be worked may be efficiently performed. No linkage means are provided between any of the bucket constructions and the tractor. Each of the buckets is a compound bucket with that of the first embodiment comprising two bucket halves divided along a somewhat horizontal plane midway of the side walls of the bucket between the cutting edge and the upper side of the bucket. Latching means are provided on the rear face of the bucket to keep the two halves together. The second bucket embodiment is also formed as two halves, however, in this embodiment, the line of division between the two halves is in a plane extending from the cutting edge upwardly and rearwardly to the rear edge of the upper wall of the bucket. The third bucket embodiment of the present invention has a rear wall which is formed separately of the rest of the bucket and pivotally mounted thereon and maintained in the closed position by a latch. In the present invention, various adjustable stops are used on the sides of the bucket and these stops cooperate in a particular manner with the boom. In all instances, the boom is pivotally mounted to the bucket on the side walls thereof adjacent the cutting edge of the bucket. When the boom is lowered to the ground level digging position, the bottom of the bucket will rest upon the ground to position the bucket for cutting. A stop on the bucket will prevent the bucket from being pivoted to cut too deep. When the boom is raised, gravity will cause the bucket to be pivoted rearwardly to a position wherein certain stops will keep the bucket in a good load retaining position as the boom is raised. For dumping in each instance it is merely necessary to unlatch the bucket and the various portions of the bucket will be operated by gravity to open the bucket sufficiently to permit the loaded material to fall therefrom.

For a detail description of the present invention, reference is first made to Figures 1 through 7 wherein the first embodiment is shown. The tractor 10 is of the four-wheel rubber tired type having a rearwardly disposed engine compartment 11 and a forwardly disposed operator's compartment 12. A boom 13 is provided in duplicate portions disposed on each side of the tractor 10. One end of each portion of the boom 13 is pivotally mounted on the tractor by means of mounting means 14. Each portion of the boom 13 extends forwardly of the tractor 10. A pair of hydraulic rams 15 disposed one on each side of the tractor 10 are provided for raising and lowering the boom 13. The head end of each hydraulic ram 15 is pivotally mounted to a bracket 16 mounted on the tractor 10 by means of pivotal mounting means 17. The rod end of each hydraulic ram 15 is pivotally mounted to one portion of the boom 13 intermediate the ends thereof by means of pivotal mounting means 18. Suitable hydraulic fluid, conduits, pump and valve means (not shown) are provided for operation of the hydraulic rams 15. Thus it may be seen that as the hydraulic rams 15 are extended, the boom is raised and as the rams are retracted, the boom 13 is lowered.

The bucket 19 which is divided into two halves comprises an upper portion 20 and a lower portion 21. The upper portion 20 comprises a curved plate 22 forming the upper wall and partial back wall of the bucket 19 and a pair of spaced apart side walls 23. The lower portion 21 comprises a curved plate 24 forming the bottom wall and part of the rear wall of the bucket 19 and a pair of spaced apart side walls 25. The two portions 20 and 21 of the bucket 19 are pivotally interconnected at the forward edges of the side walls 23 and 25 through pivotal mounting means 26. The upper edge of the side walls 25 cooperate with the lower edge of the side walls 23, and the upper rear edge of the plate 24 cooperates with the lower rear edge of the plate 22 to form a conventional bucket shape. The two portions 20 and 21 of the bucket 19 are selectively secured against any relative pivotal movement by means of the latch 27. The latch 27 is pivotally mounted at the lower rear edge of the plate 22 and engages a slot formed near the upper rear edge of the plate 24. The latch 27 may be spring loaded to the latched position and releasable by a line (not shown) extending from the latch 27 to the operator's compartment 12, or it may take a form such as shown in Figures 6 and 7. As shown therein, the plate 22 is formed to have two upstanding flanges 29 positioned in a spaced apart relationship to each other. Below the flanges 29 substantially at the lower marginal edge of the plate 22 a second pair of upstanding flanges 30 are formed. The latch 27 is formed as a bell crank and is pivotally mounted between the pair of flanges 30 by means of a pin 31. One end of the latch 27 is formed as a tooth engaging slot 32 formed near the upper edge of the plate 24. The other leg of the latch 27 is pivotally mounted to a rod 33 by means of a pin 34. The rod 33 may be the operating rod of a hydraulic ram or the operating rod of an electrical solenoid. The assembly 35 is pivotally mounted between the pair of flanges 29 by means of a pin 36. Thus it may be seen that when the rod 33 is moved inwardly of the assembly 35, the latch 27 is pivoted about pin 31 to free latch 27 from the slot 32 in the plate 24. With the latch 27 free from the slot 32, the two portions 20 and 21 of the bucket 19 may pivot relative to each other about the axis of pivotal mounting means 26. Any suitable means (not shown) may be provided for operation of the assembly 35.

The lower portion 21 of the bucket 19 carries the cutting edge 37, and the cutting edge 37 is mounted along the forward edge of the plate 24. The bucket 19 is further provided with a transverse plate 38 which is mounted on the underside of the plate 24 to extend therefrom. The plate 38 is positioned so that when the boom is placed in position shown in Figure 2 the plate 38 will depend substantially vertically downwardly from the plate 24.

The forward end of each portion of the boom 13 is pivotally mounted to the side walls 25 of the lower portion 21 of the bucket 19 substantially adjacent to the cutting edge 37 by means of pivotal mounting means 39.

To control the movement of the bucket 19, a pair of rollers 40 and a pair of stop blocks 41 are provided. The rollers 40 are rotatively mounted one on each side of the bucket 19 on the side walls 23 substantially at the upper forward edge thereof. The stop blocks 41 are adjustably secured, one on each side of the bucket 19, on the side walls 25 of the lower portion 21 of the bucket 19. The stop blocks 41 are positioned so that when the boom is lowered to the dig position at ground level, and the bottom wall of the bucket 19 is substantially horizontal, the blocks 41 engage the underside of the boom 13. As can be seen in Figure 1, the stop blocks 41 prevent any further movement of the bucket 19 in a clockwire direction about pivotal mounting means 39. These stop blocks 41 serve to counteract downwardly directed forces at the cutting edge 37 which tend to pivot the bucket 19 in a clockwise direction about pivotal mounting means 39. The rollers 40 serve two purposes, one to limit the counterclockwise rotation, as viewed in Figure 2, of the bucket 19 when the boom 13 is raised as shown therein, and to cause proper dumping of the bucket 19 when the latch 27 is released as shown in Figure 4. The rollers 40 engage the upper edge of boom 13 and will roll longitudinally therealong when the two portions 20 and 21 of the bucket 19 are pivoted relative to each other.

In operation, the operator of the loader will lower the boom 13 until the bucket rests upon the ground as shown in Figure 1. Forward movement of the tractor will then cause the cutting edge 37 to cut into any material thereahead filling the bucket 19. The operator may then raise the boom 13, and as this is done, the weight of the bucket will cause the bucket to be pivoted counterclockwise as viewed in Figure 2 until the rollers 40 rest upon the upper edge of the boom 13. With the bucket 19 at a convenient height, the operator may then carry the load to some remote location for dumping. For high-lift dumping the hydraulic rams 15 are extended substantially as shown in Figure 3 to raise the bucket 19 as shown therein. The operator may then release the latch 27, and upon doing so the weight of the bucket and the load will cause the axis of the pivotal mounting means 26 to drop. The portion 21 of the bucket 19 will be pivoted in a counterclockwise direction as viewed in Figure 4 while the portion 20 of the bucket 19 will be pivoted in a clockwise direction, as viewed in Figure 4, with some movement thereof longitudinally of the boom 13 as the rollers 40 roll therealong. As the two portions 20 and 21 of the bucket 19 pivot to the position shown in Figure 4, the load within the bucket will drop therefrom, the operator of the loader may then lower the boom 19 and upon doing so the two portions 20 and 21 of the bucket 19 will pivot as the lower portion 21 engages the ground until the latch 27 again engages the slot 32 locking the two portions 20 and 21 of the bucket 19 together. Further digging, carrying and dumping operations may then be carried on.

The subject invention may be used to spread or grade materials by raising the boom to a position such as shown in Figure 2 and by then moving the tractor 10 so that the transverse plate 38 engages the material to be spread. If a light material is being spread, the bucket may be empty in this operation. However, if rather heavy materials are spread, the bucket may be loaded preparatory to the spreading operation. The additional load in the bucket prevents the material being spread from pivoting the bucket 19 in a clockwise direction about the pivotal mounting means 39.

By adjusting the stop blocks 41, the depth of cut of the bucket 19 may be varied.

Turning next to a detailed description of the embodiment of the present invention shown in Figures 8 through 11, reference is made thereto. The elements of this embodiment which are the same as those of the one previously described are identified by the same numerals. The tractor 10, the boom 13, and the various elements for raising and lowering the boom function as previously described for the first embodiment.

The bucket 45 of the present embodiment comprises two bucket halves 46 and 47. The upper bucket half or portion comprises a somewhat U-shaped element of a pair of spaced apart side walls 48 interconnected by a top wall 49. The other half or portion 47 of the bucket 45 comprises a pair of spaced apart side walls 50 interconnected by a curved plate 51 which forms the bottom and rear wall of the bucket. The forward marginal edge of the curved plate 51 is provided with a cutting edge 52. The two bucket halves or portions are pivotally interconnected at the lower forward marginal edge of the side walls 48 of the portion 46 and the forward marginal edge of the portion 47. The two portions 46 and 47 of the bucket 45 cooperate to form a complete bucket in a plane extending from the cutting edge upwardly and rearwardly to the junction of the upper wall and the rear wall. A latch 53 locks the two portions 46 and 47 of the bucket together. The bucket 45 is pivotally mounted to the boom 13 at a point adjacent the lower forward edge of the bucket 45 by pivotal mounting means 54. The axis of pivoting of the bucket 45 on the boom 13 coincides with the axis of pivoting of the two bucket portions 46 and 47 relative to each other. The bucket 45 is further provided with two stop blocks 55 and 56. The stop block 55 is mounted on the side wall 50 of the bucket half 47 and is positioned to engage the underside of the boom 13 when the cutting edge 52 is forced downwardly in the digging function to limit the downward penetration of the cutting edge 52. The stop block 56 is mounted on the side wall 48 of the bucket half 46 and is positioned to engage the boom 13 when the boom is raised and the weight of the bucket causes a pivoting about the axis of pivotal mounting means 54 in a counterclockwise direction as viewed in Figure 9. The bucket stop 56 provides for a proper disposition of the bucket in the carrying position such that a maximum load is retained as the tractor 10 is moved. Either or both of the stop blocks 55 and 56 may be adjustable as stop blocks 41 of the first embodiment of the present invention.

The latch 53 may be operated by any means such as disclosed for the first embodiment of the present invention.

The operation of the instant embodiment is similar to that of the first. When the digging function is to be performed, the boom is lowered to the digging position such as shown in Figure 8, and the ground contact of the bottom wall 51 of the bucket 45 will position the cutting edge for loading of the bucket. If the material being cut and loaded causes the cutting edge 52 to be forced downwardly, the stop block 55 will limit the downward inclination of the cutting edge 52. After the bucket has been loaded, the boom is raised to the carrying position. As the boom is initially raised, the loaded bucket will pivot rearwardly or counterclockwise, as viewed in Figure 9, to the position wherein the stop block 56 engages the boom 13 to prevent any further rearward pivoting or tilting of the bucket 45. When the boom 13 is raised to the high-lift position preparatory to dumping, the bucket 45 will assume the position as shown in Figure 10. It should be noted that in this position the rear wall of the bucket 45 is now positioned substantially in a horizontal plane and the center of gravity of the bucket half 47 with the load therein is between the latch 53 and the pivotal mounting means 54. When the latch 53 is released, the bucket half 47 will pivot away from the bucket half 46 permitting the load in the bucket to fall from within the confines thereof. The center of gravity of the empty half 47 of the bucket 45 will move to a point vertically below the pivotal mounting means 54. From the position shown in Figure 11, the boom 13 may be lowered to cause the bucket half 47 to contact the ground and pivot the bucket half 47 to again engage the latch 53 and lock the two halves of the bucket 45 together. The bucket may then again be operated through the described cycle of digging and dumping.

Turning next to a detail description of the third embodiment of the present invention, that shown in Figures 12 through 15, reference is made thereto. As in the previously described embodiment, the parts which are the same are identified by the same numerals. The tractor 10 and the boom 13 are substantially as described for the previous embodiment.

The bucket 60 of the present embodiment comprises a compound bucket structure. This structure includes a pair of spaced apart side walls 61, a top wall 62 extending between the side walls 61, a bottom wall 63 extending between the side walls 61 along the lower edge thereof, and a back wall 64. The back wall 64 is pivotally mounted to the rearward end of the bottom wall 63 by means of pivotal mounting means 65. A latch 66 is provided at the rearward end of the upper wall 62 and engages the rear wall 64 to selectively lock the rear wall 64 over the open rear end of the bucket 60 or to permit free pivotal movement of the rear wall 64 about pivotal mounting means 65. The lower rear portion of the rear wall 64 is provided with an extending shoe portion 67 which lies substantially in a plane including the bottom wall 63 of the bucket 60 when the rear wall 64 is locked in the closed position. The bucket 60 is further provided with a cutting edge 68 mounted on the forward marginal edge of the bottom wall 63 and stop blocks 69 and 70 mounted on the side walls 61 to engage the boom 13. The bucket 60 is pivotally mounted on the forward end of the boom 13 by means of pivotal mounting means 71 positioned substantially adjacent the cutting edge 68.

The instant embodiment of the present invention operates similarly to the previously described embodiments. The stop blocks 69 and 70 which respectively limit the downward pivoting of the cutting edge 68 about the pivotal mounting means 71 and the rearward pivoting of the bucket 60 about pivotal mounting means 71, may be formed to be adjustable as stop blocks 41 of the first described embodiment. The latch 66 may also be operated by any means such as described relative to the first embodiment.

In digging the boom 13 is lowered to a position such as shown in Figure 12 and the tractor 10 moved forwardly. The bottom of the bucket will direct the cutting edge 68 toward the material to be dug. As the boom 13 is raised to a carrying position, the loaded bucket will be tipped rearwardly until the stop block 70 engages the upper surface of the boom 13 such as shown in Figure 13. In the high-lift position preparatory to dumping, the bucket 60 will assume a position such as shown in Figure 14. It should be noted that in that position the rear wall 64 is disposed substantially in a horizontal plane and supports the load within the bucket 60. When the latch 66 is released, the rear wall 64 will pivot downwardly as shown in Figure 15 to permit the load to drop from the bucket 60.

The latch will easily engage the rear wall 64 when the boom 13 is again lowered for additional digging operations as the rear wall 64 and the extending shoe 67 engage the ground.

Having described the invention what is considered new and desired to be protected by Letters Patent is:

1. In a tractor loader having a forwardly extending boom pivotally mounted on the tractor, a bucket comprising a pair of spaced apart side walls, a bottom wall, a rear wall and a top wall, said bucket being divided in a plane positioned between and substantially parallel to said top and bottom walls whereby two cooperating bucket halves are formed, means pivotally interconnecting said two bucket halves substantially at the forward marginal edges of the side walls, releasable means mounted on the rear wall of the two bucket halves for locking said two bucket halves together, a cutting edge mounted on the forward marginal edge of said bottom wall, means pivotally mounting said bucket adjacent the cutting edge thereof on the forward end of said boom, stop means mounted on said bucket to engage said boom to limit the downward movement of said cutting edge, and second stop means comprising a roller mounted on the upper bucket half adjacent the forward marginal edge of said upper wall so that said bucket is disposed at a substantially maximum load carrying angle when said boom is raised and so that when said releasable means is operated to unlock said two bucket halves, said roller will move along the upper side of said boom toward the forward end thereof as the means pivotally interconnecting said two bucket halves drops below a plane through said roller and through the means pivotally mounting the bucket on said boom.

2. In a tractor loader as claimed in claim 1, wherein said bottom wall is provided with a plate extending therefrom and transversely positioned thereon so that when said boom is raised and when said bucket is disposed at a substantially maximum load carrying angle, said extending plate will serve as a grader blade.

3. In a tractor loader having a forwardly extending boom pivotally mounted on the tractor, a bucket comprising a pair of spaced apart side walls, a bottom wall, a rear wall and a top wall, said bucket being divided in a plane positioned between and substantially parallel to said top and bottom walls whereby two cooperating bucket halves are formed, means pivotally interconnecting said two bucket halves substantially at the forward marginal edges of the side walls, releasable means mounted on the rear wall of the two bucket halves for locking said two bucket halves together, a cutting edge mounted on the forward marginal edge of said bottom wall, means pivotally mounting said bucket adjacent the cutting edge thereof on the forward end of said boom, adjustable stop means mounted on said bucket for engagement with the underside of said boom rearwardly of the forward end thereof when said boom is lowered to ground level to adjustably limit the downward pivoting of said cutting edge in any digging operation, and second stop means comprising a roller rotatively mounted on the upper bucket half substantially at the forward marginal edge of said top wall and extending outwardly therefrom sufficiently to engage the upper side of said boom when said boom is raised to thereby limit the rotative position of said bucket to that for substantially maximum load carrying when said boom is raised and so that when said releasable means is operated to unlock said two bucket halves, said roller will roll along the upper surface of said boom toward the forward end thereof as said means pivotally interconnecting said two bucket halves drops below a plane through said roller and through the means pivotally interconnecting said two bucket halves drops below a plane through said roller and through the means pivotally mounting said bucket on said boom.

References Cited in the file of this patent
UNITED STATES PATENTS

| | | |
|---|---|---|
| 1,162,607 | Hoar | Nov. 30, 1915 |
| 1,249,805 | Morison | Dec. 11, 1917 |
| 1,474,314 | Burke | Nov. 13, 1923 |
| 1,514,008 | Mosier | Nov. 4, 1924 |
| 1,526,830 | Byrne | Feb. 17, 1925 |
| 2,086,687 | Whitmire | July 13, 1937 |
| 2,760,284 | Cook | Aug. 28, 1956 |

FOREIGN PATENTS

| | | |
|---|---|---|
| 927,438 | Germany | May 9, 1955 |